United States Patent
Li et al.

(10) Patent No.: US 11,164,087 B2
(45) Date of Patent: Nov. 2, 2021

(54) SYSTEMS AND METHODS FOR DETERMINING SEMANTIC ROLES OF ARGUMENTS IN SENTENCES

(71) Applicant: Disney Enterprises, Inc., Burbank, CA (US)

(72) Inventors: Boyang Li, Wexford, PA (US); Yi Luan, Seattle, WA (US)

(73) Assignee: Disney Enterprises, Inc., Burbank, CA (US)

(*) Notice: Subject to any disclaimer, the term of this patent is extended or adjusted under 35 U.S.C. 154(b) by 1069 days.

(21) Appl. No.: 15/160,394

(22) Filed: May 20, 2016

(65) Prior Publication Data

US 2017/0337474 A1 Nov. 23, 2017

(51) Int. Cl.
| | |
|---|---|
| *G06F 16/35* | (2019.01) |
| *G06N 5/02* | (2006.01) |
| *G06N 20/00* | (2019.01) |
| *G06F 40/30* | (2020.01) |
| *G06F 40/35* | (2020.01) |

(52) U.S. Cl.
CPC .............. *G06N 5/02* (2013.01); *G06F 16/355* (2019.01); *G06F 40/30* (2020.01); *G06F 40/35* (2020.01); *G06N 20/00* (2019.01)

(58) Field of Classification Search
CPC ...... G06F 17/2785; G06F 17/279; G06N 5/02
See application file for complete search history.

(56) References Cited

U.S. PATENT DOCUMENTS

| | | | | |
|---|---|---|---|---|
| 2014/0369596 | A1* | 12/2014 | Siskind | G06K 9/00751 382/158 |
| 2015/0278908 | A1* | 10/2015 | Nice | G06Q 30/0631 705/26.7 |
| 2016/0055240 | A1* | 2/2016 | Tur | G10L 15/22 707/706 |
| 2016/0085743 | A1* | 3/2016 | Haley | G06F 17/28 704/9 |

OTHER PUBLICATIONS

Abend et al., "Fully Unsupervised Core-Adjunct Argument Classification". 2010, The Hebrew University, 226-236 (Year: 2010).*
Garg et al., *Unsupervised Semantic Role Induction with Global Role Ordering*, Proceedings of the 50th Annual Meeting of the Association for Computational Linguistics, Republic of Korea, pp. 145-149 (Jul. 2012).
Lang et al., *Similarity-Driven Semantic Role Induction via Graph Partitioning*, Computational Linguistics vol. 40, No. 3 (2014).

(Continued)

*Primary Examiner* — Taelor Kim
(74) *Attorney, Agent, or Firm* — Farjami & Farjami LLP

(57) ABSTRACT

There is provided a system including a non-transitory memory storing an executable code and a hardware processor executing the executable code to receive an input sentence including a first predicate and at least a first argument depending from the first predicate, identify the first predicate, identify the first argument based on the first predicate, apply a dependency multiplication to determine a semantic role of the first argument based on the first predicate, and assign the first argument to an argument cluster including one or more similar arguments based on the semantic role of the first argument.

18 Claims, 6 Drawing Sheets

(56) References Cited

OTHER PUBLICATIONS

Titov et al., *A Bayesian Approach to Unsupervised Semantic Role Induction*, Saarland University, Saarbrucken, Germany (2012).
Lang et al., *Unsupervised Semantic Role Induction via Split-Merge Clustering*, Proceedings of the 49$^{th}$ Annual Meeting of the Association for Computational Linguistics, Portland, Oregon pp. 1117-1126 (Jun. 2011).
Titov et al., *Unsupervised Induction of Semantic Roles within a Reconstruction-Error Minimization Framework*, University of Amsterdam (2015).
Woodsend et al., *Distributed Representations for Unsupervised Semantic Role Labeling*, Proceedings of the 2015 Conference on Empirical Methods in Natural Language Processing, Lisbon, Portugal, pp. 2482-2491 (Sep. 2015).

\* cited by examiner

| Argument | SymDep (SBJ) | SymDep (OBJ) | word2vec |
|---|---|---|---|
| car | crash, roar, capsize, land, lug, unload, bounce, ship | sell, purchase, buy, retrieve, board, haul, lease, unload | train, splash, mail, shelter, jet, ferry, drill, ticket |
| victim | injure, die, protest, complain, weep, hospitalize, shout, suffer | insult, assault, stalk, avenge, harass, interview, housing, apprehend | void, murder, kidnap, widow, massacre, surge, sentence, defect |
| teacher | teach, mentor, educate, note, reminisce, say, learn, lecture | hire, bar, recruit, practice, assault, enlist, segregate, encourage | coach, mentor, degree, master, guide, pilot, partner, captain |
| student | learn, resurface, object, enroll, note, protest, deem, teach | teach, encourage, educate, assault, segregate, enroll, attend, administer | graduate, degree, mortgage, engineer, mentor, pilot, partner, pioneer |

SYSTEMS AND METHODS FOR DETERMINING SEMANTIC ROLES OF ARGUMENTS IN SENTENCES

BACKGROUND

On the quest to create artificial intelligence, understanding natural language is a challenge. Natural language is complex, and statements describing the same situation can be formulated in more than one way. For example, a sentence may be stated in a passive form or may be stated in an active form, but still communicate the same information. Conventional systems for understanding natural language rely on training data and manual annotation of the training data to interpret natural language.

SUMMARY

The present disclosure is directed to systems and methods for determining semantic roles of arguments in sentences, substantially as shown in and/or described in connection with at least one of the figures, as set forth more completely in the claims.

BRIEF DESCRIPTION OF THE DRAWINGS

FIG. 5 shows a table including a plurality of exemplary predicates and arguments determined using the system of FIG. 1, according to one implementation of the present disclosure.

DETAILED DESCRIPTION

Figure 1:
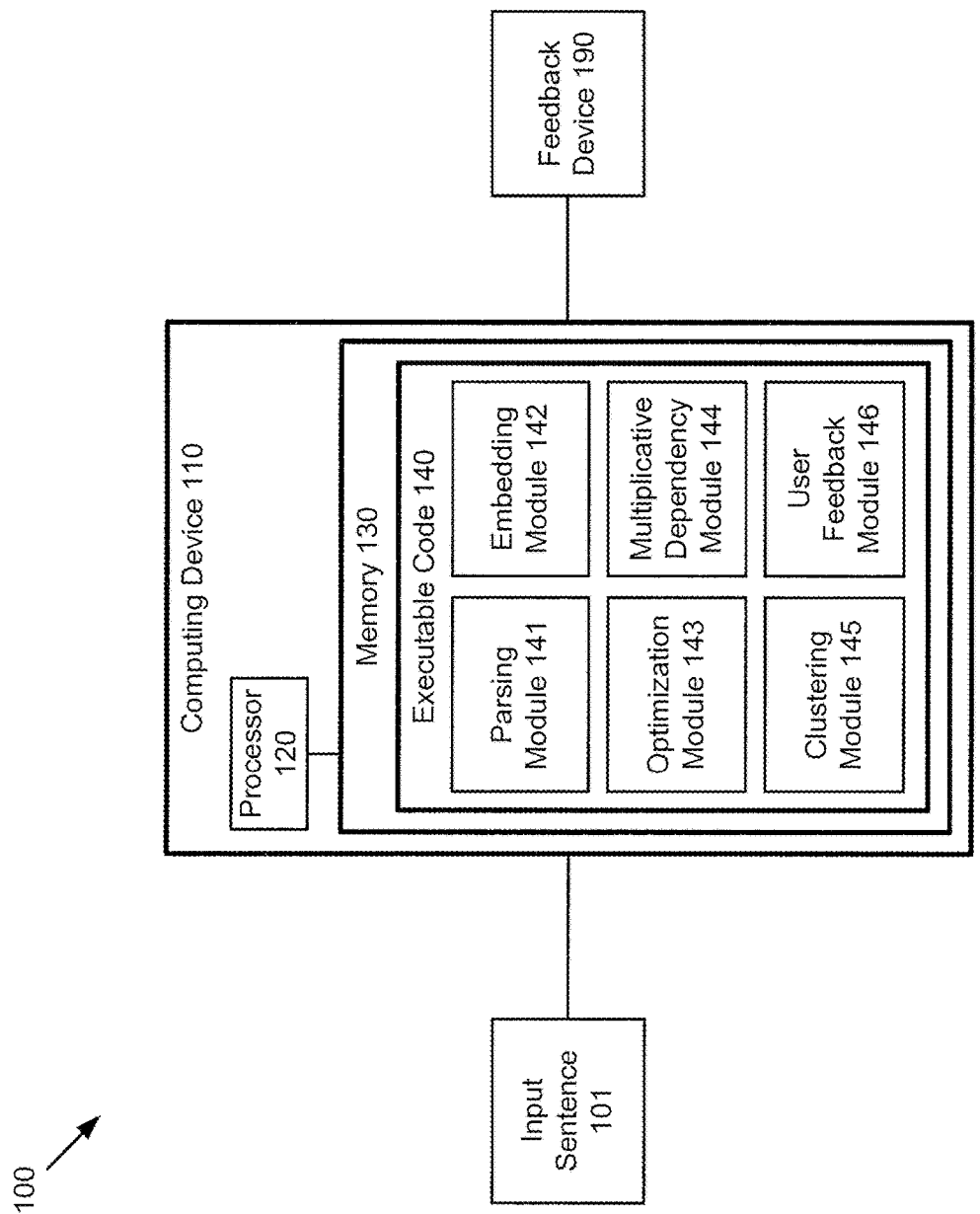
FIG. 1 shows a diagram of an exemplary system for determining semantic roles of arguments in sentences, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for determining semantic roles of arguments in sentences, according to one implementation of the present disclosure. System 100 includes input sentence 101, computing device 110, and feedback device 190. Input sentence 101 may be a natural language sentence including a plurality of words. In some implementations, input sentence 101 may be a sentence received from a user, such as a voice or text input from the user. Input sentence 101 may be a text sentence, such as a sentence from a written source or a text message, such as a sentence typed for online communication, or input sentence 101 may be an audio received from an audio input, such as a sentence spoken into a microphone, e.g., for telephonic communication or voice input computation. Input sentence 101 may include a plurality of predicates including a first predicate and a plurality of arguments, including a first argument and a second argument, where the first argument has a dependency relation to the predicate and the second argument has a dependency relation to the predicate that is different from the dependency relation of the first argument. The dependency relations between arguments of input sentence 101 and predicates of input sentence 101 may come from a well-defined set of relations, and may be identified using artificial intelligence (AI) technology.

Computing device 110 includes processor 120 and memory 130. Processor 120 is a hardware processor, such as a central processing unit (CPU) or as a graphics processing unit (GPU), used in computing device 110. Memory 130 is a non-transitory storage device for storing computer code for execution by processor 120, and also for storing various data and parameters. Memory 130 includes executable code 140. Executable code 140 includes one or more software modules for execution by processor 120 of computing device 110. As shown in FIG. 1, executable code 140 includes parsing module 141, embedding module 142, optimization module 143, multiplicative dependency module 144, clustering module 145, and user feedback module 146.

Parsing module 141 is a software module stored in memory 130 for execution by processor 120 to parse input sentence 101. Parsing module 141 may identify predicates of input sentence 101, including the first predicate, and parsing module 141 may identify arguments of input sentence 101, including the first argument, the second argument, etc. To identify words of input sentence 101, parsing module 141 may use heuristic rules, or parsing module 141 may use statistical parsing. In some implementations, parsing module 141 may identify a part of speech for each word in input sentence 101. In some implementations, parsing module 141 may identify a grammatical role of each word in input sentence 101, such as a noun, an adjective, a verb, etc. In other implementations, parsing module 141 may parse input sentence 101 based on syntactic dependencies such as dependencies according to a MATE parser, universal dependency, Stanford dependency, etc.

Embedding module 142 is a software module stored in memory 130 for execution by processor 120 to create an embedding of each word of input sentence 101. Embedding module 142 may represent each word of input sentence 101 as a vector. In some implementations, embedding module 142 may map each word to a vector of a real number to represent each word as a vector. The vector may include a component for each letter of the word. The vector may be a one-dimensional vector, or the vector may be a multi-dimensional vector, such as a vector having a few dozen dimensions to a few thousand dimensions. In some implementations, the embedding of a word in input sentence 101 may be the vector having real number components representing each letter in the word.

Optimization module 143 is a software module stored in memory 130 for execution by processor 120 to optimize the prediction of one or more arguments in input sentence 101. Optimization module 143 may optimize the probability of an argument in input sentence 101, where optimizing may refer to maximizing or minimizing a function. In some implementations, optimization module 143 may maximize the probability that an argument that is predicated by executable code 140 is the correct argument in input sentence 101. Maximizing the probability that an argument is correct in input sentence 101 may include considering the argument in the context of input sentence 101, including surrounding arguments in input sentence 101 and one or more predicates in input sentence 101. In some implementations, optimization module 143 may optimize the prediction of the argument in input sentence 101 based on a plurality of training examples.

Multiplicative dependency module 144 is a software module stored in memory 130 for execution by processor 120 to determine the semantic role of one or more arguments in input sentence 101. Multiplicative dependency module 144 may determine one or more matrices that may be used to encode the effect of a dependency relation between an argument of input sentence 101 and the predicate associated with the argument. In some implementations, multiplicative dependency module 144 may include a matrix describing the dependency relation between the argument and the predicate associated with the argument, and may include another matrix describing the dependency relation between the argument and the predicate associated with the argument when the argument is used in context.

Clustering module 145 is a software module stored in memory 130 for execution by processor 120 to cluster one or more similar arguments together based on the semantic role of each argument. In some implementations, clustering module 145 may perform agglomerative clustering on the embeddings of the first argument and the second argument of input sentence 101. In other implementations, clustering module 145 may user K-means clustering, a Gaussian Mixture Model, or a non-parametric model, such as Dirichlet Process clustering. Clustering module 145 may consider the dependency relation between an argument of input sentence 101 and the predicate of input sentence 101. For example, clustering module 145 may determine the path from an argument to the predicate using the path of dependency relations from the argument to the predicate, and/or a parse tree describing input sentence 101. Clustering module 145 may place arguments with identical paths from an argument to the predicate in the same seed cluster. In some implementations, clustering module 145 may cluster embeddings to represent the semantic roles of the embeddings in each cluster. For example, clustering module 145 may group embeddings representing the components of an event or action, such as who initiated an event, what was acted upon by an action, the cause of an event or action, the reason for an event or action, the location of an event or action, etc. Take, for example, the sentence "Mr. Bush met him privately, in the White House, on Thursday." The sentence includes the predicate "met" having two arguments, "Mr. Bush" and "him" Clustering module 145 may include an embedding of "Mr. Bush" with embeddings of arguments corresponding to the action initiator in a sentence and an embedding of "him" with embeddings of arguments corresponding to the action receiver in a sentence. In some implementations, clustering module 145 may include an embedding of "privately" with other embeddings corresponding to the manner in which an action happened, an embedding of "the Whitehouse" with other embeddings corresponding to where an event takes place, and an embedding of "on Thursday" with other embeddings corresponding to the time of an action or event.

User feedback module 146 is a software module stored in memory 130 for execution by processor 120 to provide user feedback. In some implementations, the user feedback may be based on the predicate of input sentence 101, the first argument of input sentence 101, the second argument of input sentence 101, etc. User feedback module 146 may provide user feedback in response to input sentence 101. For example, input sentence 101 may be a question or statement submitted to an online customer service program, and user feedback module 146 may provide a text response for display on the user's computer responding to the question. In other implementations, input sentence 101 may be an audio input, such as a telephonically transmitted statement, and user feedback module 146 may transmit a response to be played using the speaker in the user's telephone.

Feedback device 190 may include one or more feedback elements for providing user feedback, such as a display, a speaker, etc. Executable code 140 may provide feedback using the display in the form of a text message response to the input sentence. For example, the input sentence may include a question submitted by the user online, and the user feedback may be a response to the question. In other implementations, the input sentence may include a telephonic sentence, such as the user calling in to a service and receiving automated help. The input may be converted from an analog input to a digital input using an analog-to-digital (A/D) converter (not shown) and the user feedback may be an audio response transmitted telephonically back to the user.

Figure 2:
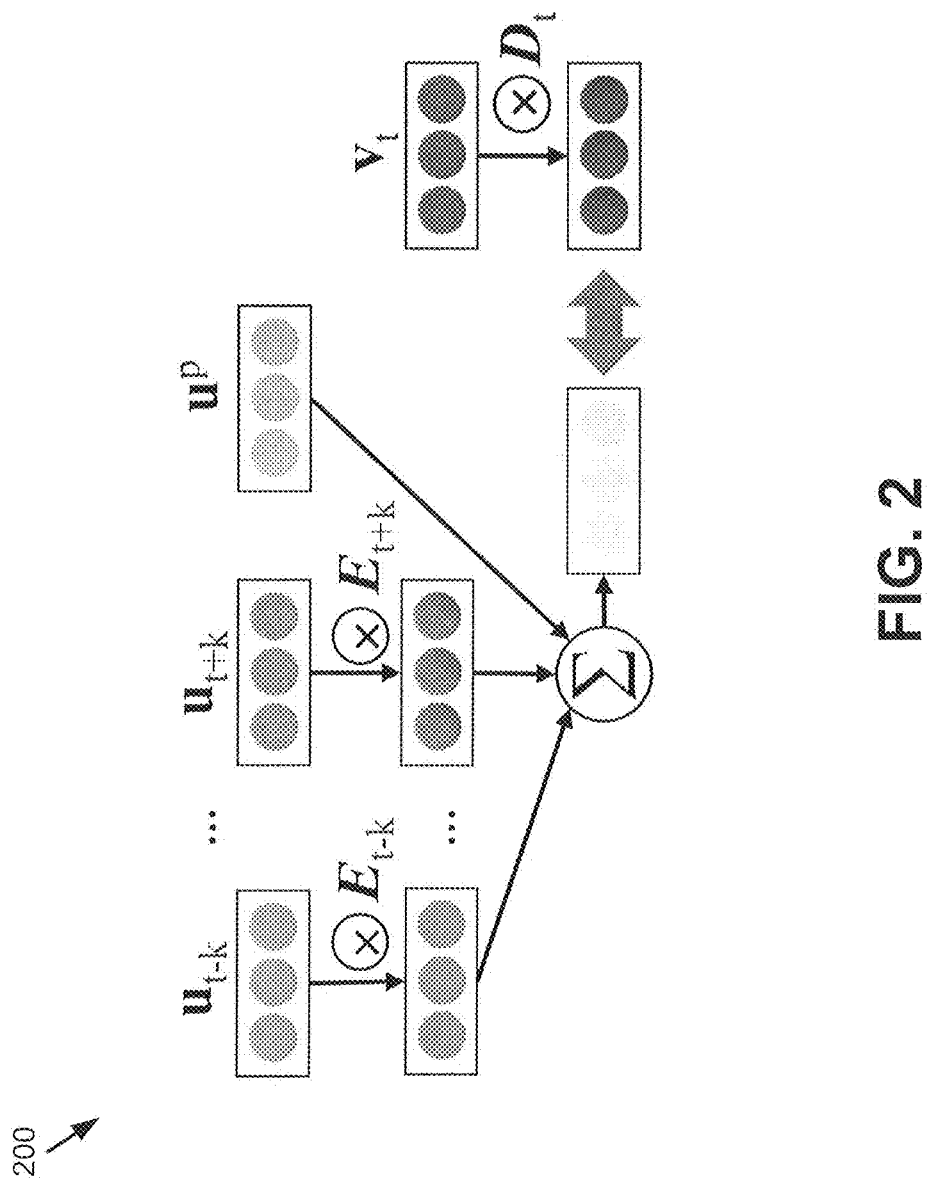
FIG. 2 shows a diagram of an exemplary model for determining semantic roles of arguments in sentences, according to one implementation of the present disclosure.

FIG. 2 shows a diagram of an exemplary model for determining semantic roles of arguments in sentences, according to one implementation of the present disclosure. Diagram 200 depicts optimization of the $\Sigma$ function by optimization module 143. The semantic dependency model depicted in FIG. 2 may be a symmetric dependency in which multiplicative dependency module 144 applies the dependency multiplication to all arguments in input sentence 101. As shown in FIG. 2, $v_t$ may represent the embedding of the $t^{th}$ argument in input sentence 101, and $u_t$ may be the embedding of the $t^{th}$ argument when the $t^{th}$ argument is part of the context of input sentence 101. The embedding $u_{t-k}$ may represent an argument that precedes argument $u_t$, and embedding $u_{t+k}$ may represent an argument that succeeds sentence element $u_t$. As shown in FIG. 2, $\otimes$ $E_{t-k}$ represents the syntactic relation that $u_{t-k}$ element has in input sentence 101. Similarly, the $\otimes$ $E_{t+k}$ represents the syntactic relation that $u_{t+k}$ element has in input sentence 101. A matrix may represent each syntactic relation. The embedding $u_{t-k}$ is multiplied by the matrix $E_{t-k}$, and the embedding $u_{t+k}$ is multiplied by the matrix $E_{t+k}$, resulting in two new vectors. In some implementations, a nonlinear operation may be applied to the two new vectors, such as a sigmoid function, a hyperbolic tangent function, etc. The two new vectors are then added to the embedding of the predicate, $u^p$, to yield a vector predicting $u_t$ (not shown).

Figure 3:
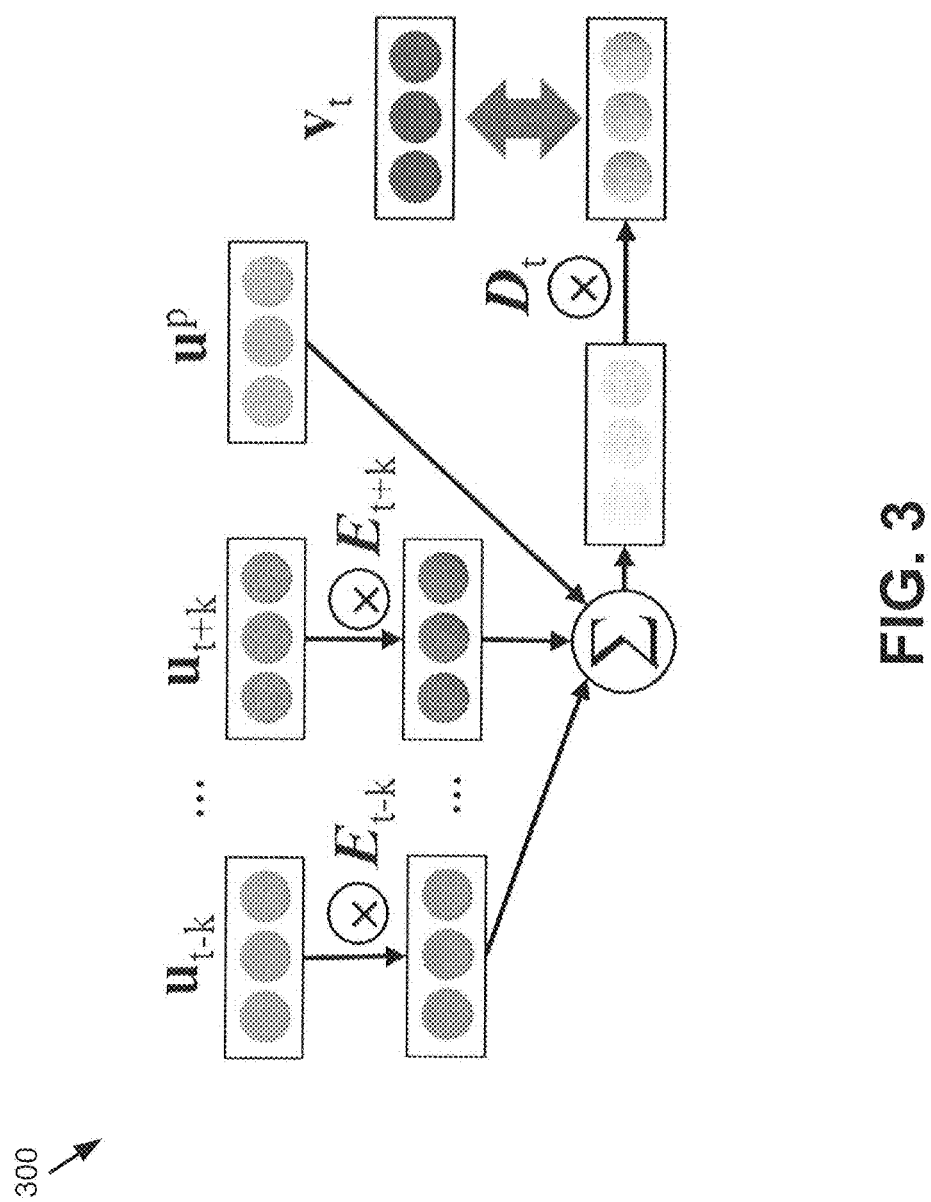
FIG. 3 shows a diagram of another exemplary model for determining semantic roles of arguments in sentences, according to one implementation of the present disclosure.

FIG. 3 shows a diagram of another exemplary model for determining semantic roles of arguments in sentences, according to one implementation of the present disclosure. The components of FIG. 3 correspond to the components of FIG. 2. As shown in FIG. 3, however, all multiplication takes place on the left side of the double arrow. Applying all multiplication asymmetrically, to one side of the double arrow, may concentrate the dependency relations' effects by shifting the dependency of the predicted argument to the other side.

Figure 4:
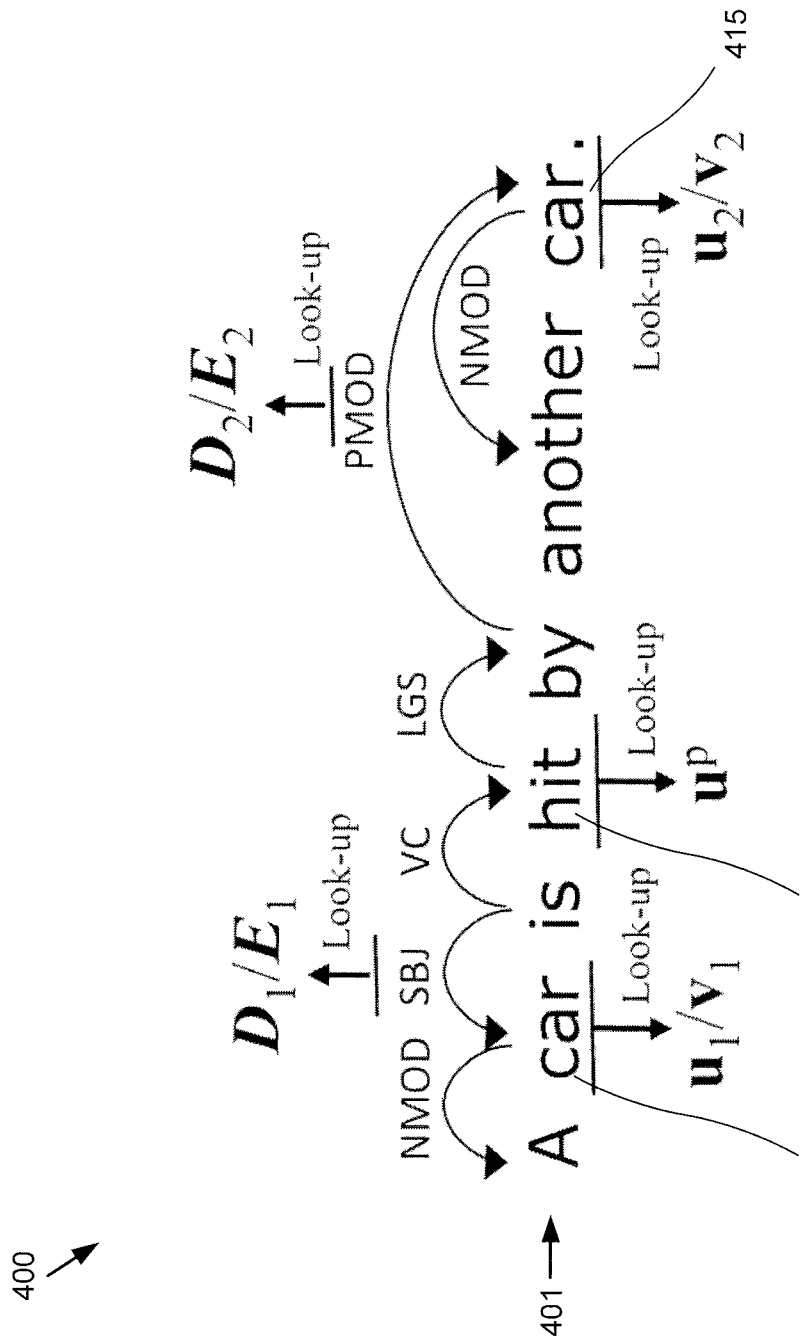
FIG. 4 shows a diagram of an exemplary sentence with dependency labels for use with the system of FIG. 1, according to one implementation of the present disclosure.

FIG. 4 shows a diagram of an exemplary sentence with dependency labels for use with the system of FIG. 1, according to one implementation of the present disclosure. The sentence shown in FIG. 4 demonstrates how embeddings relate to the parse tree of input sentence 401. Input sentence 401 includes predicate 411, i.e. the verb "hit," and two arguments associated with predicate 411, i.e. argument 413 and argument 415. In input sentence 401, argument 413 is the argument that is acted upon, referred to as the patient and/or subject, as indicated by the label SBJ. Argument 415 is the argument that does the acting, referred to as the agent. Diagram 400 includes dependency relations: modifier of nominal (NMOD), subject (SBJ), verb chain (VC), logical subject (LGS), and between preposition and its child in a prepositional phrase (PMOD). Dependency relation labels describe how the words in sentence 401 relate to each other. The path from one word to another may be described using the dependency relation labels. For example, the path from argument 413 to predicate 411 may be $\langle SBJ^{-1}, VC \rangle$, where the superscript −1 refers to the direction, which indicates that the first step from argument 413 is in the direction opposite the direction of the arrow leading to argument 413.

In some implementations, vector $u^p$ may represent the embedding of predicate 411, vector $u_1$ may represent the embedding of argument 413 when argument 413 is used in a sentence, such as input sentence 401, and vector $v_1$ may represent argument 413 when argument 413 is part of the context. Vector $u_2$ may represent argument 415 when argument 415 is used in a sentence, and vector $v_2$ may represent argument 415 when argument 415 is part of the context. Executable code 140 may use matrix $D_1$ to represent the effect of the dependency relation between argument 413 and predicate 411, and $E_1$ may represent the corresponding dependency matrix for argument 413 if used as a context. Matrix $D_2$ may represent the effect from the dependency relation between argument 415 and predicate 411, and $E_2$ may represent the corresponding dependency matrix for argument 415 if used as a context.

FIG. 5 shows a table including a plurality of exemplary predicates and arguments determined using the system of FIG. 1, according to one implementation of the present disclosure. Diagram 500 shows predicates that are most similar to argument-dependency pairs as determined using executable code 140, and also shows similar words selected from all predicates, based on a word2vec embedding. The results demonstrate that executable code 140 is able to bias arguments towards certain dependency relations. For example, executable code 140 may identify that car is usually the subject of the predicates crash and unload, and the object of the predicates sell and purchase. In comparison, the most similar predicates calculated using the word2vec embeddings are mostly semantically related words, which do not sufficiently reflect the relation between arguments and predicates.

Figure 6:
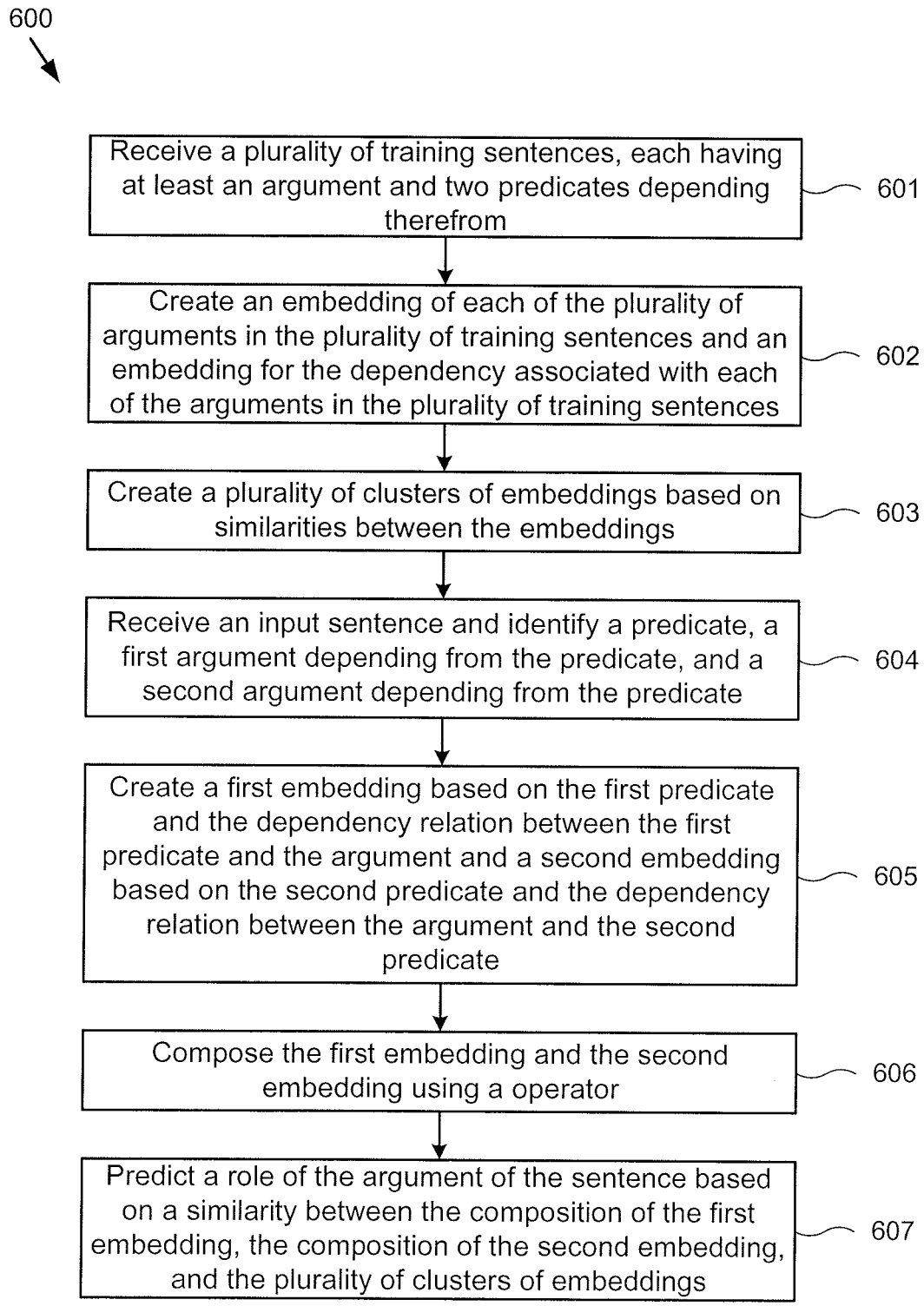
FIG. 6 shows a flowchart illustrating an exemplary method of determining semantic roles of arguments in sentences, according to one implementation of the present disclosure.

FIG. 6 shows a flowchart illustrating an exemplary method of determining semantic roles of arguments in sentences, according to one implementation of the present disclosure. Method 600 begins at 601, where executable code 140 receives a plurality of training sentences, each training sentence having at least a predicate and an argument depending therefrom. The training sentences may each include a plurality of predicates with one or more arguments depending from each predicate. In some implementations, parsing module 141 may identify the predicate and one or more arguments in each training sentence of the plurality of training sentences. Parsing module 141 may identify dependencies between the predicate and the arguments of each predicate in the plurality of training sentences. To identify the dependencies, parsing module 141 may generate a dependency parse for each training sentence of the plurality of training sentences. Parsing module 141 may create a syntactic dependency parse for each training sentence of the plurality of training sentences. In some implementations, the dependency parse may be created using a MATE parser, the universal model, the Stanford model, etc. Optimization module 143 may maximize the probability of each argument based on the context of the argument, one or more surrounding arguments, and the dependency relations of the argument.

At 602, executable code 140 creates an embedding of each of the plurality of arguments in the plurality of training sentences and an embedding for the dependency associated with each of the arguments in the plurality of training sentences. In some implementations, embedding module 142 may create an embedding for each word in each training sentence. Each embedding may be a multi-dimensional vector. Based on the training, embedding module 142 may create an embedding of each of the plurality of arguments in the plurality of training sentences and an embedding for the dependency associated with each of the arguments in the plurality of training sentences.

At 603, executable code 140 may cluster the embeddings of the arguments and dependencies of the plurality of training sentences based on similarities among the vectors. Clustering module 145 may create a plurality of clusters each including at least one embedding. Clustering module 145 may perform agglomerative clustering on the embeddings of the arguments and dependencies of the plurality of training sentences. In some implementations, clustering module 145 may first create a number of seed clusters, which may be hierarchically merged. In order to assign an argument to a cluster, clustering module 145 may find the path from the head word of the argument to the predicate. For example, as shown in FIG. 4, the path from the first instance of the argument "car" to the predicate "hit" is $\langle SBJ^{-1}, VC \rangle$, where the superscript −1 indicates direction. Clustering module 145 may place arguments with identical paths into the same seed cluster. In some implementations, clustering module 145 may define the similarity between clusters as the cosine similarity (CosSim) between the centroids minus a penalty for clustering together two arguments from the same sentence as the arguments probably serve different semantic roles. For clusters C and C', clustering module 145 may define V(C,C') as the set of arguments $a_i \in C$ such that another argument in C' appears in the same sentence with $a_i$. The penalty may be computed as:

$$pen(C, C') = \frac{|V(C, C')| + |V(C', C)|}{|C| + |C'|} \qquad (7)$$

Clustering module 145 may define the centroids as x and y respectively. The similarity may be computed as:

$$S(C,C')=\text{CosSim}(x,y)-\alpha \cdot pen(C,C') \qquad (8)$$

where α may be heuristically set to one (1). In some implementations, a user may manually inspect the clusters and label them with argument roles, such as patient or agent.

At 604, executable code 140 receives an input sentence 101. Parsing module 141 may identify a predicate of input sentence 101 and one or more arguments depending from the predicate, including a first argument. In some implementations, parsing module 141 may identify a first dependency relation between the predicate and the first argument. Parsing module 141 may identify a second argument depending from the predicate. In some implementations, parsing module 141 may identify a second dependency relation between the predicate and the second argument.

At 605, executable code 140 creates a first embedding based on the first argument and the dependency relation between the first argument and the predicate. In some implementations, embedding module 142 may create a second embedding based on a second argument and the dependency relation between the predicate and the second argument, etc. In some implementations, embedding module 142 may represent the predicate, the first argument, the second argument, and/or other words included in input sentence 101 as vectors, each called an embedding. Executable code 140 may let $v_t$ be the embedding of the $t^{th}$ argument in a sentence, and $u_t$ the embedding of the argument when it is part of the context. Let $u^p$ be the embedding of the predicate. Embedding $u^c = \{u_{t-k}, \ldots, u_{t-1}, u_{t+1}, \ldots, u_{t+k}\}$ includes the vectors surrounding the $t^{th}$ argument with a window of size k. The prediction of the $t^{th}$ argument is given by:

$$p(v_t|u^p,u^c) \propto \exp(f(v_t)^T g(u^p,u^c)) \quad (1)$$

$f(\cdot)$ and $g(\cdot)$ are two transformation functions of the target argument embedding and context vectors respectively. In some implementations, executable code 140 may further associate a dependency relation with each argument. Matrix $D_t$ may encode the effect from the dependency relation between the $t^{th}$ argument and its predicate, and $E_t$ may be the corresponding dependency matrix for the $t^{th}$ argument if it is used as a context. The $\otimes$ operator may be defined as:

$$v_t \otimes D_t \triangleq \tan h(D_t v)$$

$$u_t \otimes E_t \triangleq \tan h(E_t v_t), \quad (2)$$

where $\tan h(\cdot)$ is the element-wise hyperbolic tangent function.

At 606, executable code 140 composes the first embedding and the second embedding using the $\otimes$ operator. Equation (2) composes an argument and its dependency with a multiplicative nonlinear operation. The multiplicative formulation encourages the decoupling of dependencies and arguments, which may be useful in learning representations focused on lexical and dependency semantics respectively.

In some implementations, executable code 140 may apply the dependency multiplication to all arguments, i.e., multiplicative dependency module 144 applies the dependency symmetrically:

$$f_1(v_t) = v_t \otimes D_t \quad (3)$$

$$g_1(u^p, u_c) = u^p \otimes E^p + \sum_{u_i \in u^c} u_i \otimes E_i \quad (4)$$

where $E^p$ represents a dummy dependency for the predicate. Executable code 140 may set $E^p = I$. This model is named Symmetric-Dependency (SYMDEP).

An alternative model is to concentrate the dependency relations' effects by shifting the dependency of the predicted argument to the other side:

$$g_2(u^p, u^c) = \left(u^p \otimes E^p + \sum_{u_i \in u^c} u_i \otimes E_i\right) \otimes D_t \quad (5)$$

$$f_2(v_t) = v_t \quad (6)$$

This model is named Asymmetric-Dependency or ASYMDEP. Note that Equation (5) actually defines a feed-forward neural network structure $g_2(u^p, u^c)$ for predicting arguments. Method 600 continues at 607, where executable code 140 predicts a role of the argument of the sentence based on a similarity between the composition of the first embedding, the composition of the second embedding, and the plurality of clusters of embeddings learned from the plurality of training sentences. In some implementations, clustering module 145 may compare the embedding of the target argument with the plurality of clusters created in training the model, and predict the argument belongs to the cluster with which it most closely matches.

At 608, executable code 140 provides a user feedback based on the meaning of the input sentence. In some implementations, user feedback module 146 may display a text sentence displayed on a display in response to input sentence 101, such as when input sentence 101 is a text question. In other implementations, user feedback module 146 may transmit a signal to play an audio over a speaker in response to input sentence 101, such as when input sentence 101 is a telephonic audio question. User feedback module 146 may transmit the response signal to play the audio on a speaker of the phone of a user.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
   a non-transitory memory storing an executable code;
   a hardware processor configured to execute the executable code to:
   receive an input sentence including a first predicate and a first argument depending from the first predicate, the input sentence further including a second argument depending from the first predicate;
   identify the first predicate;
   identify the first argument based on the first predicate;
   represent the first argument as a first multi-dimensional vector having a plurality of components each corresponding to a respective one of a plurality of letters included in the first argument;
   apply a dependency multiplication by multiplying the first multi-dimensional vector representing the first argument with a representation of a syntactic relation between the first argument and the first predicate to determine a semantic role of the first argument in the input sentence;
   assign the first argument to a first argument cluster based on the semantic role of the first argument;
   assign the second argument to the first argument cluster; and
   in response to assigning both the first argument and the second argument to the first argument cluster, determine a similarity between the first argument cluster and a second argument cluster by deducting a value as a penalty from a cosine similarity between a first centroid of the first argument cluster and a second centroid of the second argument cluster.

2. The system of claim 1, wherein the hardware processor is further configured to execute the executable code to:
   determine a meaning of the input sentence based on the first predicate, the first argument, and the semantic role of the first argument; and
   provide a user feedback based on the meaning of the input sentence, the user feedback including one of a text feedback or an audio feedback.

3. The system of claim 1, wherein the dependency multiplication is applied to the input sentence symmetrically.

4. The system of claim 1, wherein the hardware processor is further configured to execute the executable code to:
   receive a third argument of the input sentence, the third argument depending from the first predicate;
   identify the third argument based on the first predicate;
   apply a third dependency multiplication by multiplying the third argument with a third representation of a third syntactic relation between the third argument and the first predicate to determine a third semantic role of the third argument in the input sentence; and
   assign the third argument to the second argument cluster based on the third semantic role of the third argument.

5. The system of claim 1, wherein the first argument cluster includes a plurality of arguments having a similar relationship to the first predicate, and wherein identifying the first argument based on the first predicate is an unsupervised parsing of the input sentence.

6. The system of claim 1, wherein the hardware processor is further configured to execute the executable code to apply the dependency multiplication using a matrix.

7. A method for use with a system including a non-transitory memory and a hardware processor, the method comprising:
   receiving, using the hardware processor, an input sentence including a first predicate and a first argument depending from the first predicate, the input sentence further including a second argument depending from the first predicate;
   identifying, using the hardware processor, the first predicate;
   identifying, using the hardware processor, the first argument based on the first predicate;
   representing, using the hardware processor, the first argument as a first multi-dimensional vector having a plurality of components each corresponding to a respective one of a plurality of letters included in the first argument;
   applying, using the hardware processor, a dependency multiplication by multiplying the first multi-dimensional vector representing the first argument with a representation of a syntactic relation between the first argument and the first predicate to determine a semantic role of the first argument in the input sentence;
   assigning, using the hardware processor, the first argument to a first argument cluster based on the semantic role of the first argument;
   assigning, using the hardware processor, the second argument to the first argument cluster; and
   in response to assigning both the first argument and the second argument to the first argument cluster, determining, using the hardware processor, a similarity between the first argument cluster and a second argument cluster by deducting a value as a penalty from a cosine similarity between a first centroid of the first argument cluster and a second centroid of the second argument cluster.

8. The method of claim 7, further comprising:
   determining, using the hardware processor, a meaning of the input sentence based on the first predicate, the first argument, and the semantic role of the first argument; and
   providing, using the hardware processor, a user feedback based on the meaning of the input sentence, the user feedback including one of a text feedback or an audio feedback.

9. The method of claim 7, wherein the dependency multiplication is applied to the input sentence symmetrically.

10. The method of claim 7 further comprising:
    receiving, using the hardware processor, a third argument of the input sentence, the third argument depending from the first predicate;
    identifying, using the hardware processor, the third argument based on the first predicate;
    applying, using the hardware processor, a third dependency multiplication by multiplying the third argument with a third representation of a third syntactic relation between the third argument and the first predicate to determine a third semantic role of the third argument in the input sentence; and
    assigning, using the hardware processor, the third argument to the second argument cluster based on the third semantic role of the third argument.

11. The method of claim 7, wherein the first argument cluster includes a plurality of arguments having a similar relationship to the first predicate, and wherein identifying the first argument based on the first predicate is an unsupervised parsing of the input sentence.

12. The method of claim 7, wherein applying the dependency multiplication uses a matrix.

13. The system of claim 1, wherein the dependency multiplication is applied to the input sentence asymmetrically.

14. The method of claim 7, wherein the dependency multiplication is applied to the input sentence asymmetrically.

15. A method for use with a system including a non-transitory memory and a hardware processor, the method comprising:
    receiving, using the hardware processor, an input sentence including a first predicate, a first argument depending from the first predicate, and a second argument depending from the first predicate;
    identifying, using the hardware processor, the first predicate;
    identifying, using the hardware processor, the first argument based on the first predicate;
    representing, using the hardware processor, the first argument as a first multi-dimensional vector having a plurality of components each corresponding to a respective one of a plurality of letters included in the first argument;
    applying, using the hardware processor, a dependency multiplication to the first multi-dimensional vector representing the first argument to determine a semantic role of the first argument based on the first predicate;
    assigning, using the hardware processor, the first argument to a first argument cluster based on the semantic role of the first argument;

assigning, using the hardware processor, the second argument to the first argument cluster; and in response to assigning both the first argument and the second argument to the first argument cluster, determining, using the hardware processor, a similarity between the first argument cluster and a second argument cluster by deducting a value as a penalty from a cosine similarity between a first centroid of the first argument cluster and a second centroid of the second argument cluster.

16. The system of claim 1, wherein the penalty is computed as:

$$pen(C, C') = \frac{|V(C, C')| + |V(C', C)|}{|C| + |C'|}$$

where C is the first argument cluster, C' is the second argument cluster, and V(C,C') defines a set of arguments $a_i \in C$ such that a third argument in C' appears in the input sentence with $a_i$, and where S(C,C') is the similarity between the first argument cluster and the second argument cluster defined by:

$$S(C,C')=CosSim(x,y)-\alpha \cdot pen(C,C')$$

where CosSmi(x,y) is the cosine similarity between the first centroid x of the first argument cluster and the second centroid y of the second argument cluster minus the penalty pen(C,C') multiplied by a heuristically set to one.

17. The method of claim 7, wherein the penalty is computed as:

$$pen(C, C') = \frac{|V(C, C')| + |V(C', C)|}{|C| + |C'|}$$

where C is the first argument cluster, C' is the second argument cluster, and V(C,C') defines a set of arguments $a_i \in C$ such that a third argument in C' appears in the input sentence with $a_i$, and where S(C,C') is the similarity between the first argument cluster and the second argument cluster defined by:

$$S(C,C')=CosSim(x,y)-\alpha \cdot pen(C,C')$$

where CosSmi(x,y) is the cosine similarity between the first centroid x of the first argument cluster and the second centroid y of the second argument cluster minus the penalty pen(C,C') multiplied by $\alpha$ heuristically set to one.

18. The method of claim 15, wherein the penalty is computed as:

$$pen(C, C') = \frac{|V(C, C')| + |V(C', C)|}{|C| + |C'|}$$

where C is the first argument cluster, C' is the second argument cluster, and V(C,C') defines a set of arguments $a_i \in C$ such that a third argument in C' appears in the input sentence with $a_i$, and where S(C,C') is the similarity between the first argument cluster and the second argument cluster defined by:

$$S(C,C')=CosSim(x,y)-\alpha \cdot pen(C,C')$$

where CosSmi(x,y) is the cosine similarity between the first centroid x of the first argument cluster and the second centroid y of the second argument cluster minus the penalty pen(C,C') multiplied by $\alpha$ heuristically set to one.

* * * * *